E. A. Sterry,

Faucet,

No. 4,022, Reissued June 7, 1870.

United States Patent Office.

EDWARD A. STERRY, OF NORWICH, CONNECTICUT.

*Letters Patent No.* 13,047, *dated June* 12, 1855; *extended seven years; reissue No.* 4,022, *dated June* 7, 1870.

IMPROVEMENT IN FAUCETS.

The Schedule referred to in these Letters Patent and making part of the same

I, EDWARD A. STERRY, of Norwich, in the county of New London and State of Connnecticut, have invented a certain Improvement in Stop-Cocks, of which the following is a specification.

My invention consists in such an adjustment of the valve to the barrel of a compression faucet or stop-cock, by means of one or more grooves and guides, as will enable the valve to rise and fall vertically to and from its seat, and thereby prevent the grinding friction caused by the turning of the valve upon the seat.

The stop-cock may be made either with one or more grooves in the barrel, and corresponding guides on the valve, or with the grooves in the valve and the guides on the barrel.

One method of constructing my improved stop-cock is shown by the accompanying drawing, which is made part of this specification, and in which—

Figure 1:
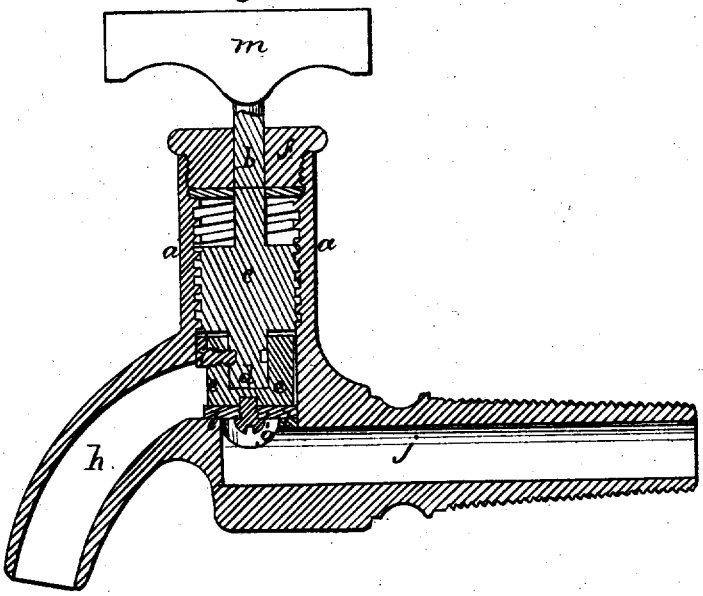
Figure 2:
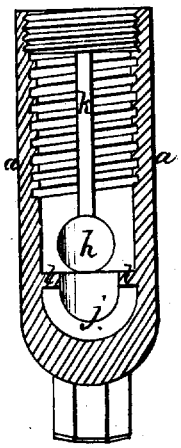

Figure 1 is a vertical longitudinal section thereof, representing the valve in a closed position; and Figure 2, a transverse section with the valve removed.

The valve *e* is connected to the shank *d* by means of a socket in the valve, that receives said shank, and the screw *i*, which passes through the side of the valve and into an annular groove in the side of the said shank, by which the key can be turned without turning the valve, but cannot be elevated or depressed without moving the valve with it.

The head of the screw *i* fits into and works freely in the groove *k* in the side of the vertical chamber *a*, and thereby prevents the valve from turning around as it is elevated and depressed.

I am aware that valves have been made to rise and fall vertically without being turned upon their axes by other methods, and, therefore, I do not claim the non-rotating principle as my invention; but What I do claim, and desire to secure by Letters Patent, is—

The arrangement of one or more grooves and guides in the construction of a compression faucet or stop-cock, by means of which the valve can be governed while rising and falling, and prevented from rotating or turning upon its axis.

EDWARD A. STERRY.

Witnesses:
GEO. D. FULLER,
OLIVER P. WATTLES.